US008751968B2

(12) United States Patent
Bamford et al.

(10) Patent No.: US 8,751,968 B2
(45) Date of Patent: Jun. 10, 2014

(54) METHOD AND SYSTEM FOR PROVIDING A USER INTERFACE FOR ACCESSING MULTIMEDIA ITEMS ON AN ELECTRONIC DEVICE

(75) Inventors: Drew Bamford, Taoyuan (TW); Yi-Shan Lin, Taoyuan (TW); I-Fen Shih, Taoyuan (TW); Shih-Hao Yeh, Taoyuan (TW); Hsu-Jung Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 578 days.

(21) Appl. No.: 12/698,015

(22) Filed: Feb. 1, 2010

(65) Prior Publication Data

US 2011/0191685 A1 Aug. 4, 2011

(51) Int. Cl.
*G06F 3/048* (2013.01)
(52) U.S. Cl.
USPC ............................ 715/841; 715/835; 715/838
(58) Field of Classification Search
CPC .................................................. G06F 3/04817
USPC .................... 715/841, 730, 835, 838
See application file for complete search history.

(56) References Cited

U.S. PATENT DOCUMENTS

| | | | |
|---|---|---|---|
| 5,812,123 A | 9/1998 | Rowe et al. | |
| 6,380,957 B1 * | 4/2002 | Banning | 715/828 |
| 2006/0059425 A1 * | 3/2006 | Anspach et al. | 715/713 |
| 2007/0101294 A1 | 5/2007 | Fong et al. | |
| 2007/0220580 A1 * | 9/2007 | Putterman et al. | 725/134 |
| 2008/0059909 A1 * | 3/2008 | Parada et al. | 715/841 |
| 2008/0155458 A1 * | 6/2008 | Fagans et al. | 715/781 |
| 2009/0228825 A1 * | 9/2009 | Van Os et al. | 715/780 |
| 2009/0327939 A1 * | 12/2009 | Johns et al. | 715/765 |
| 2011/0138330 A1 * | 6/2011 | Sanders et al. | 715/835 |

FOREIGN PATENT DOCUMENTS

EP   1712983 A2   10/2006

OTHER PUBLICATIONS

Pogue et al., "Windows XP Professional: The Missing Manual," Chapter 8, Pictures, Sounds, and Movies, Jan. 3, 2003, pp. 257-308.

* cited by examiner

*Primary Examiner* — Kieu Vu
*Assistant Examiner* — Aaron Lowenberger
(74) *Attorney, Agent, or Firm* — Perkins Coie LLP

(57) ABSTRACT

A system and method for accessing multimedia items using an electronic device determines a set of first level categories based on multimedia items associated with the electronic device. The system determines second level category graphics and first level category graphics corresponding to the set of first level categories. The first level category graphics are generated based on one or more second level category graphics associated with the first level category. The system displays a first view that comprises some or all of the first level category graphics. In response to a user input selecting a particular first level category graphic, the system shows a second view that simultaneously displays first level category graphics and second level category graphics associated with the selected first level category. In response to a user input selecting a second level category, the system displays accesses a multimedia item associated with the selected second level category.

25 Claims, 9 Drawing Sheets

METHOD AND SYSTEM FOR PROVIDING A USER INTERFACE FOR ACCESSING MULTIMEDIA ITEMS ON AN ELECTRONIC DEVICE

BACKGROUND

As mobile technology improves, mobile devices have become smaller and more powerful. The wireless networks they connect to have improved as well. These improvements mean that mobile devices can now be used for many functions beyond simple voice calling. For example, these devices can be used to send email, browse the Internet, and send instant messages. Mobile devices have also expanded to add functionality previously found only in dedicated media player devices, including playing multimedia items such as music files and video files. This functionality can be used to play multimedia items stored on the mobile device or streamed from remote servers accessed through the wireless network. The expanded capabilities of modern mobile devices also include improvements in input and display technologies. For example, many modern mobile devices include large, high-resolution displays that are capable of displaying more complicated user interfaces than were possible on earlier, smaller screens. Many mobile devices now include touch-sensitive screens that allow more intuitive control of the device's user interface. However, interface technologies have changed only slowly to accommodate these additional capabilities.

DETAILED DESCRIPTION

A system and method for providing a user interface for accessing multimedia items through an electronic device is disclosed (hereinafter referred to as the "media interface system" or the "system"). The system operates on an electronic device capable of managing and displaying or playing multimedia items. In particular, the electronic device is capable of accessing multimedia items stored locally on the device or in a remote storage location. The system provides an interface for navigating and selecting particular multimedia items to display or play through the electronic device. To support this, the electronic device comprises one or more input devices, which may comprise a touch-sensitive screen and one or more hardware buttons. The electronic device also comprises a display device, such as a screen, and an audio output component. In some examples, the system is implemented on mobile devices, such as mobile telephones, smart phones, personal digital assistants (PDAs), PDA phones, laptop computers, tablet PCs, handheld e-mail devices, handheld navigation devices, handheld game devices, handheld media players, or other mobile communication/computing devices.

The system begins operation by determining a set of artists associated with the multimedia items being navigated. The set of artists may be determined using metadata stored in the multimedia items or using data stored separately from the multimedia items in a database or library listing. The system then determines album graphics for some or all of the set of artists. In this step, the system also determines a collective graphic based on multiple album graphics associated with the individual artist. The system then determines an artist graphic for some or all of the set of artists. The artist graphic for a particular artist is based on one or more of the album graphics associated with that artist. In one example, the artist graphic is generated by tiling multiple album graphics into a single graphic.

During use, the system initially displays a first view of the user interface that comprises only artist graphics associated with a portion of the set of artists. The system then receives a user input selecting an artist graphic. In response, the system displays a second view that simultaneously displays artist graphics and album graphics associated with the selected artist. If the user selects the artist again, the system hides the album graphics. It the system receives a command selecting an album, the system displays a new view that shows some or all of the multimedia items associated with the selected album. The system may also respond to a scroll command by scrolling the user interface display in the direction indicated by the command.

Figure 1:
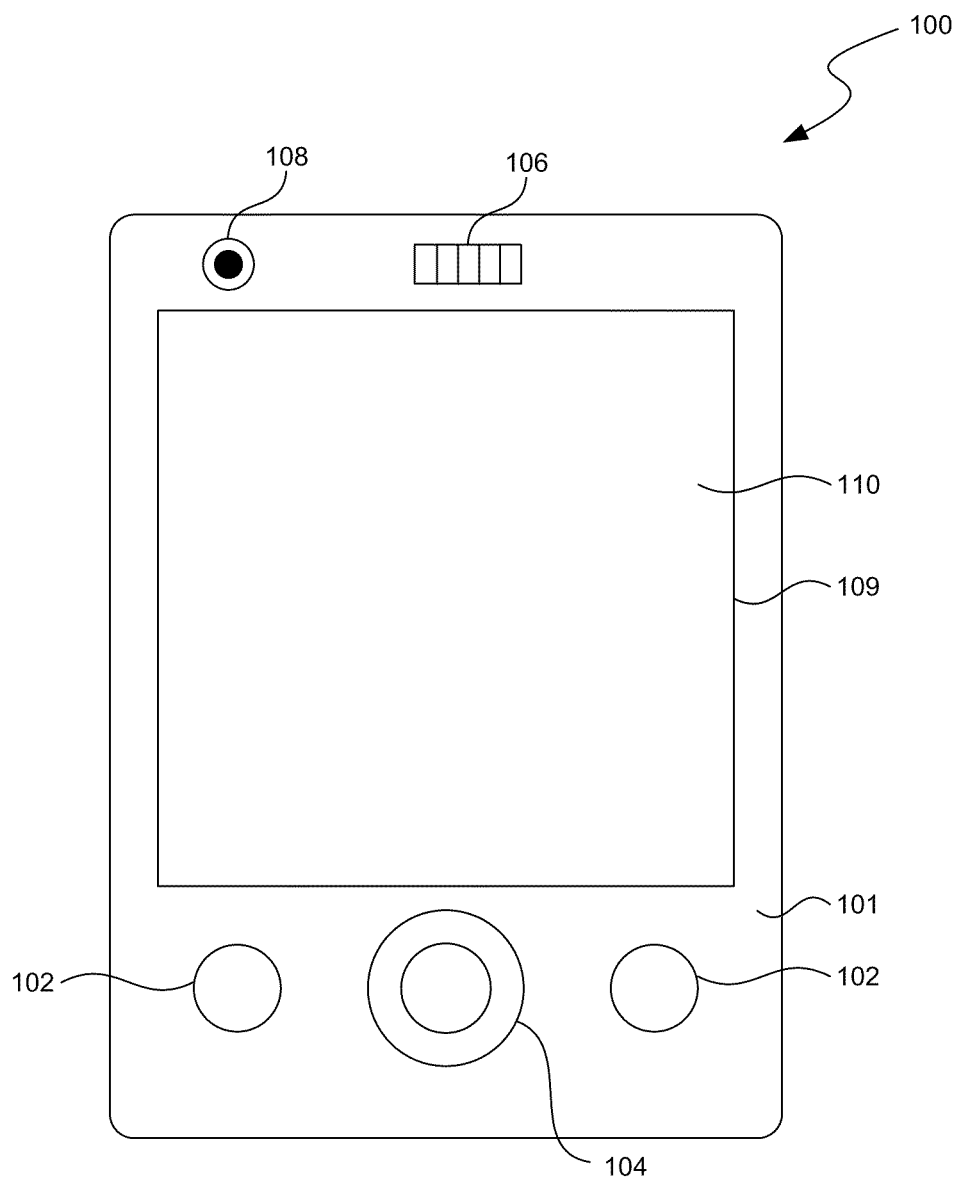
FIG. 1 is a front view of a mobile device suitable for implementing a media interface system.

FIG. 1 is a front view of a mobile device 100 suitable for implementing a media interface system. As shown in FIG. 1, the mobile device 100 may comprise a housing 101, a plurality of push buttons 102, a directional keypad 104 (e.g., a five-way key, a joystick, a trackball, or an optical mouse), a speaker 106, a camera 108, and a display 110 carried by the housing 101. The mobile device 100 may also comprise microphones, transceivers, photo sensors, and/or other computing components generally found in PDA devices, cellular phones, laptop computers, tablet PCs, smart phones, handheld e-mail devices, or other mobile communication/computing devices. The mobile device 100 may also comprise one or more audio output components in addition to the speaker 106. For example, the mobile device 100 may have a secondary speaker or a headphone jack to enable the mobile device 100 to play music or other audio.

The display 110 may comprise a liquid-crystal display (LCD), a plasma display, a vacuum fluorescent display, a light-emitting diode (LED) display, a field emission display, and/or other suitable types of display configured to present a user interface. The mobile device 100 also comprises a touch sensing component 109 configured to receive input from a user. For example, the touch sensing component 109 may comprise a resistive, capacitive, infrared, surface acoustic wave (SAW), and/or other types of touch screen. The touch sensing component 109 may be integrated with the display 110 or may be independent from the display 110. In the illustrated example, the touch sensing component 109 and the display 110 have generally similarly sized access areas. In other examples, the touch sensing component 109 and the display 110 may have differently sized access areas. For example, the touch sensing component 109 may have an access area that extends beyond the boundaries of the display 110.

The mobile device 100 may also comprise a camera 108 suitable for taking pictures or recording video. The camera 108 comprises an optical image sensor and a lens and may also have a flash associated with it for taking pictures in low-light conditions. Although the camera 108 is shown on the front face of the mobile device 100, the camera 108 could also be located on the rear face of the device. Alternatively, the mobile device 100 might be configured with multiple cameras, such as with a first camera on the front face and a second camera on the back face.

Figure 2:
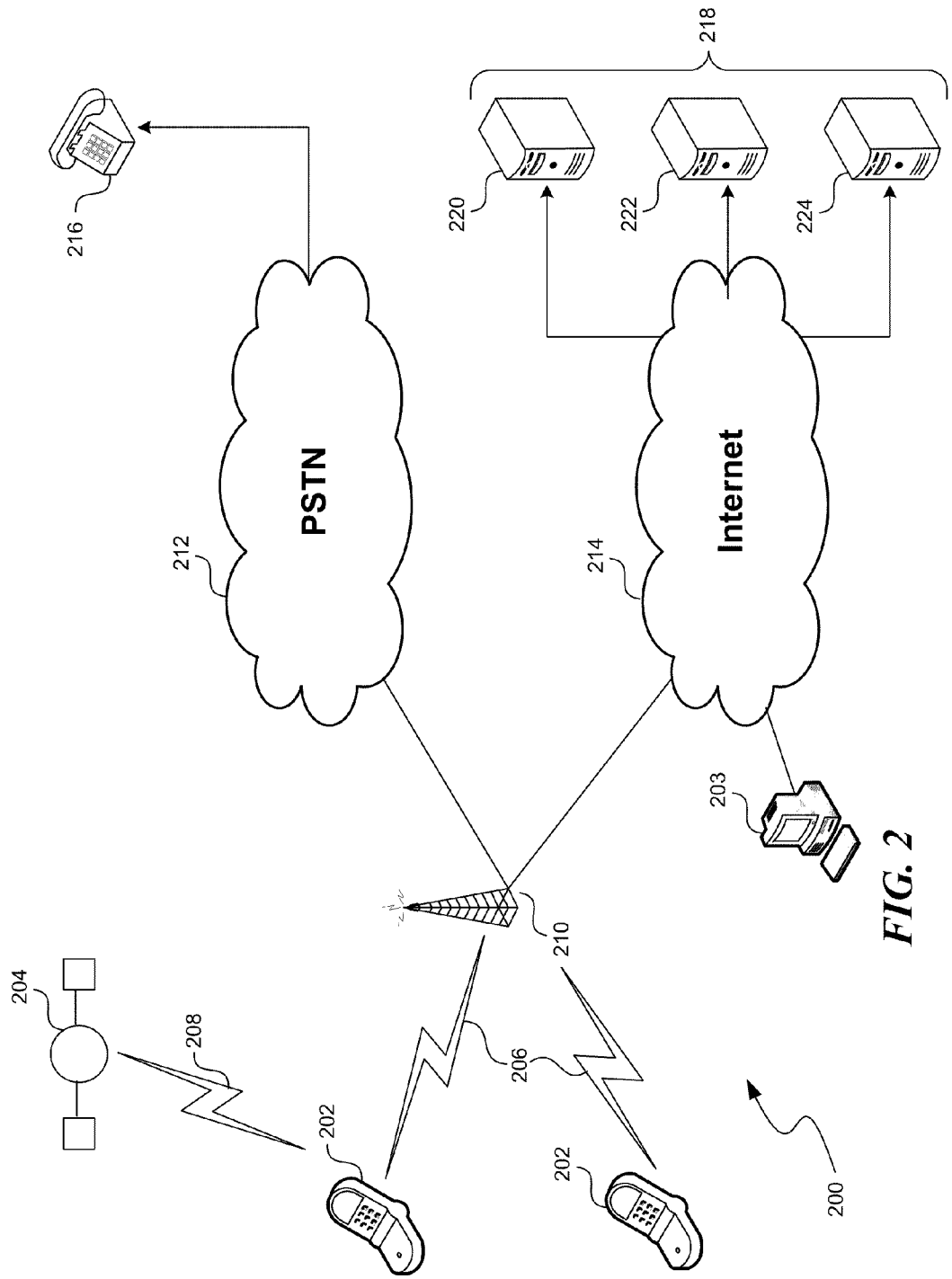
FIG. 2 is a network diagram of a representative environment in which the media interface system operates.

FIG. 2 is a network diagram of a representative environment 200 in which the media interface system operates. A plurality of mobile devices 202 roam in an area covered by a wireless network. The mobile devices are, for example, cellular phones or mobile Internet devices, such as the mobile device 100 shown in FIG. 1. The mobile devices 202 communicate to a cellular transceiver 210 through a wireless connection 206. The wireless connection 206 could be implemented using any system for transmitting digital data. For example, the connection could use a cellular network implementing UMTS or CDMA2000 or a non-cellular network implementing WiFi (IEEE 802.11) or Bluetooth. Although wireless connections are most common for these mobile devices, the devices may also communicate using a wired connection such as Ethernet.

In some configurations, the mobile devices 202 also have a Global Positioning System (GPS) receiver embedded in them to provide location information. In these configurations, the mobile devices 202 also receive a location signal 208 from one or more GPS satellites 204. For clarity, the figure only shows one satellite. However, a GPS receiver generally requires several satellites in order to determine its location. Alternatively or additionally, the cellular transceiver 210 may, with assistance from the mobile devices 202, employ known signal triangulation and/or signal delay techniques to determine the location of each wireless device.

The cellular transceiver 210 is connected to one or more networks that provide backhaul service for the wireless network. The cellular transceiver 210 is connected to a Public-Switched Telephone Network ("PSTN") 212, which provides a connection between the mobile network and a remote telephone 216 on another network. When a user of one of the mobile devices 202 makes a voice telephone call, the cellular transceiver 210 routes the call through the wireless network's voice backhaul (not shown) to the PSTN 212. The PSTN 212 then automatically connects the call to the remote telephone 216. If the remote telephone 216 is another mobile device, the call is routed through a second wireless network's backhaul to another cellular transceiver.

The cellular transceiver 210 is also connected to the Internet 214, which provides a packet-based connection to remote devices 218 supporting network applications. When the user of one of the mobile devices 202 communicates through a data connection, the cellular transceiver routes the packet data through the wireless network's data backhaul (not shown) to the Internet 214 (or another packet-based network). The Internet connects the wireless network to remote devices 218, including an e-mail server 220, a web server 222, and an instant messenger server 224. Of course, the remote devices 218 could include any application available over the Internet 214, such as a file transfer protocol (FTP) server or a streaming media server. In addition, the environment 200 may also comprise a computer 203, which may be portable or non-portable and is also connected to the Internet 214.

Figure 3:
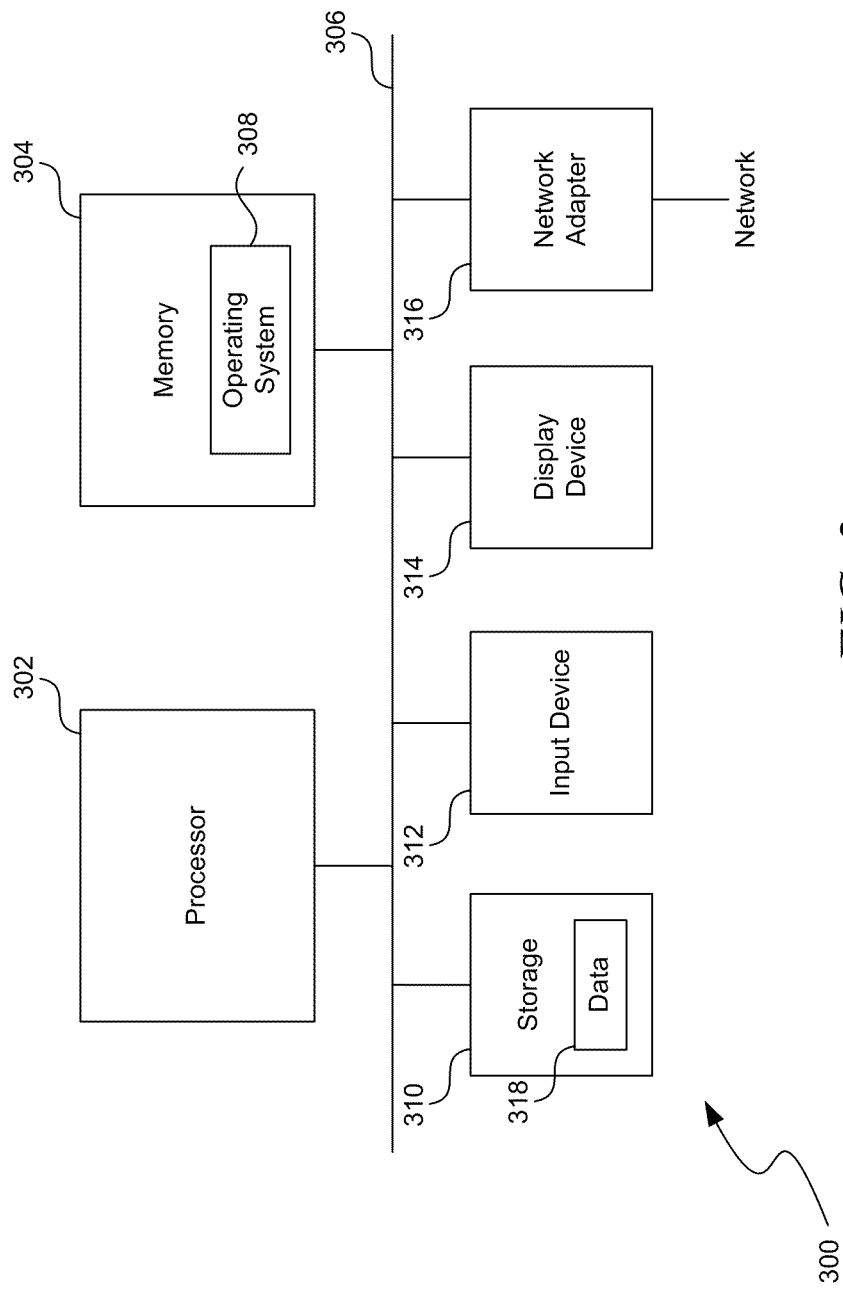
FIG. 3 is a high-level block diagram showing an example of the architecture of a device.

FIG. 3 is a high-level block diagram showing an example of the architecture of a device 300. The device 300 may represent the mobile devices 202 or the computer 203 of FIG. 2. The device 300 comprises one or more processors 302 and memory 304 coupled to an interconnect 306. The interconnect 306 shown in FIG. 3 is an abstraction that represents any one or more separate physical buses, point-to-point connections, or both connected by appropriate bridges, adapters, or controllers. The interconnect 306, therefore, may comprise, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire."

The processor(s) 302 may comprise central processing units (CPUs) of the device 300 and, thus, control the overall operation of the device 300. In certain examples, the processor(s) 302 accomplish this by executing software or firmware stored in memory 304. The processor(s) 302 may be, or may comprise, one or more programmable general purpose or special purpose microprocessors, digital signal processors (DSPs), programmable controllers, application-specific integrated circuits (ASICs), programmable logic devices (PLDs), or the like, or a combination of such devices.

The memory 304 is, or comprises, the main memory of the device 300. The memory 304 represents any form of fixed or removable random access memory (RAM), read-only memory (ROM), flash memory, or the like, or a combination of such devices. In use, the memory 304 stores, among other things, the operating system 308 of the device 300.

The device 300 comprises an input device 312, which enables a user to control the device. The input device 312 may comprise a keyboard, trackpad, touch sensitive screen (e.g., the touch sensing component 109 of FIG. 1), or other standard computer input device. The device 300 also comprises a display device 314 suitable for displaying a user interface, such as the display 110 (FIG. 1). The device 300 further comprises a network adapter 316 that provides the device 300 with the ability to communicate with remote devices over a network and may be, for example, a wireless adapter. The device 300 may further comprise local storage 310 coupled to the interconnect 306. The local storage 310 may comprise, for example, a flash memory device configured to provide mass storage and stores data 318 used by the mobile device.

The device 300 may access and play back a plurality of multimedia items through a speaker or other audio output component, such as a headphone jack. The multimedia items may be stored locally, such as in the local storage 310. Alternatively, the multimedia items may be stored remotely, such as on a remote storage server, or provided through a streaming media service. Multimedia items generally consist of data, such as video or music data, and metadata, which comprises information about the item that may be used to classify or sort the item. For an audio item, the metadata may comprise a song title, artist name, album title, song length, release date, etc. The media interface system provides a user interface that enables a user to select multimedia items by navigating based on the artist names and album titles for those multimedia items.

Figure 4A:
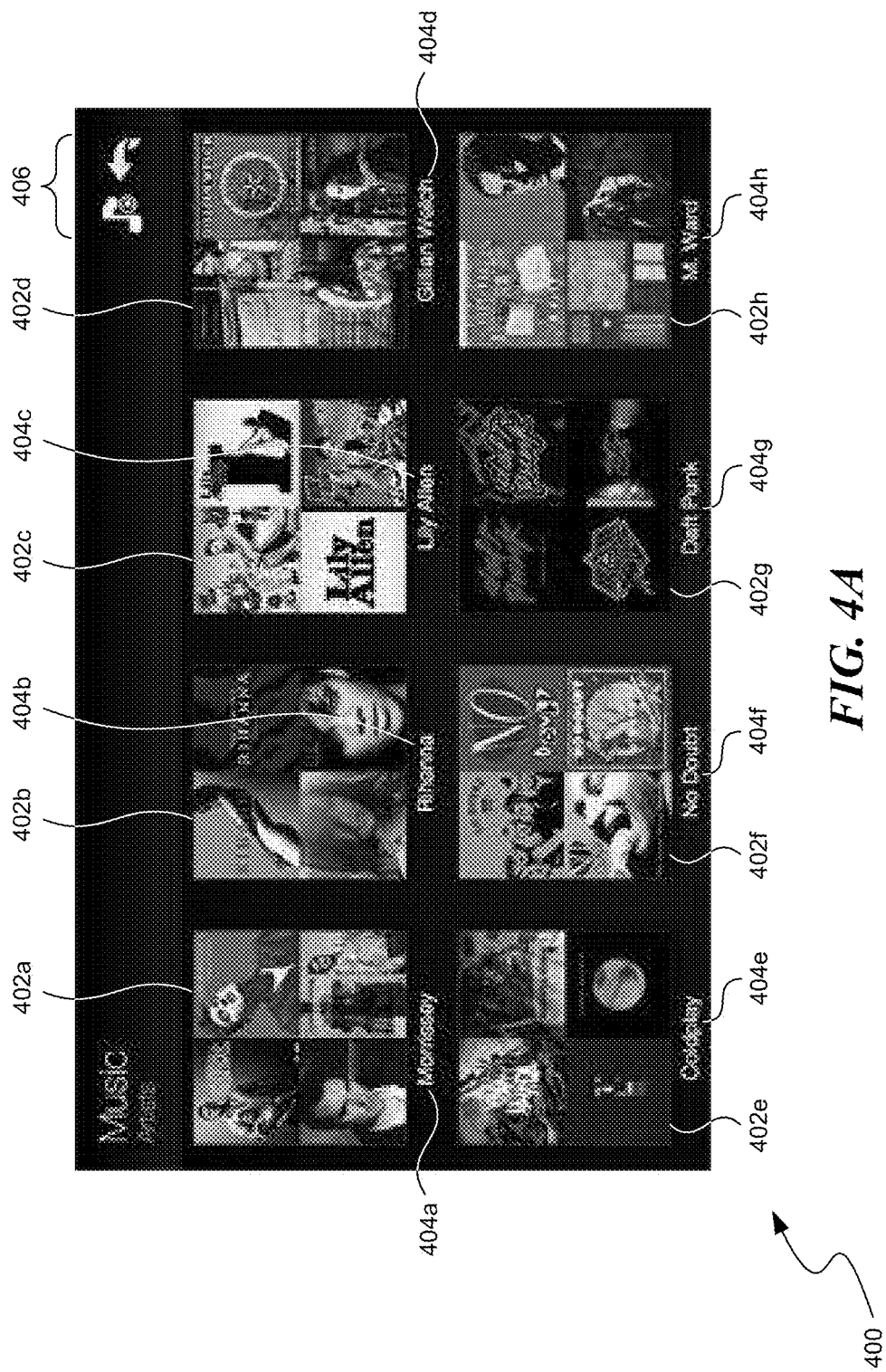
FIGS. 4A-4D illustrate multiple views of a representative interface implemented by the media interface system.

FIGS. 4A-4D illustrate multiple views of a representative interface implemented by the media interface system. In particular, FIG. 4A is a first view 400 of the representative interface. The interface is provided by an electronic device, such as the mobile device 202 or the computer 203, and may be displayed on the display 110. As shown in FIG. 4A, the interface displays icons and text for a set of artists whose media may be accessed through the interface. In particular, the view 400 shows a set of multiple artist graphics 402*a*-402*h*. The generation of these artist graphics is discussed in greater detail below. Each of the artist graphics 402*a*-402*h* has corresponding text 404*a*-404*h* that shows the name of the artist. The user interface also comprises one or more control icons 406, which may be used to control aspects of the user interface, such as navigation or audio volume.

Generally, the electronic device will be able to access multimedia items for more artists than may be displayed on its display. Therefore, the artist graphics 402a-402h represent only a portion of the available artists. A user may display different portions of the collection by using an interface device (e.g., a touch-sensitive screen) to scroll the first view 400 to the left or right or pan the first view 400 to the left, right, up, or down.

Figure 4B:
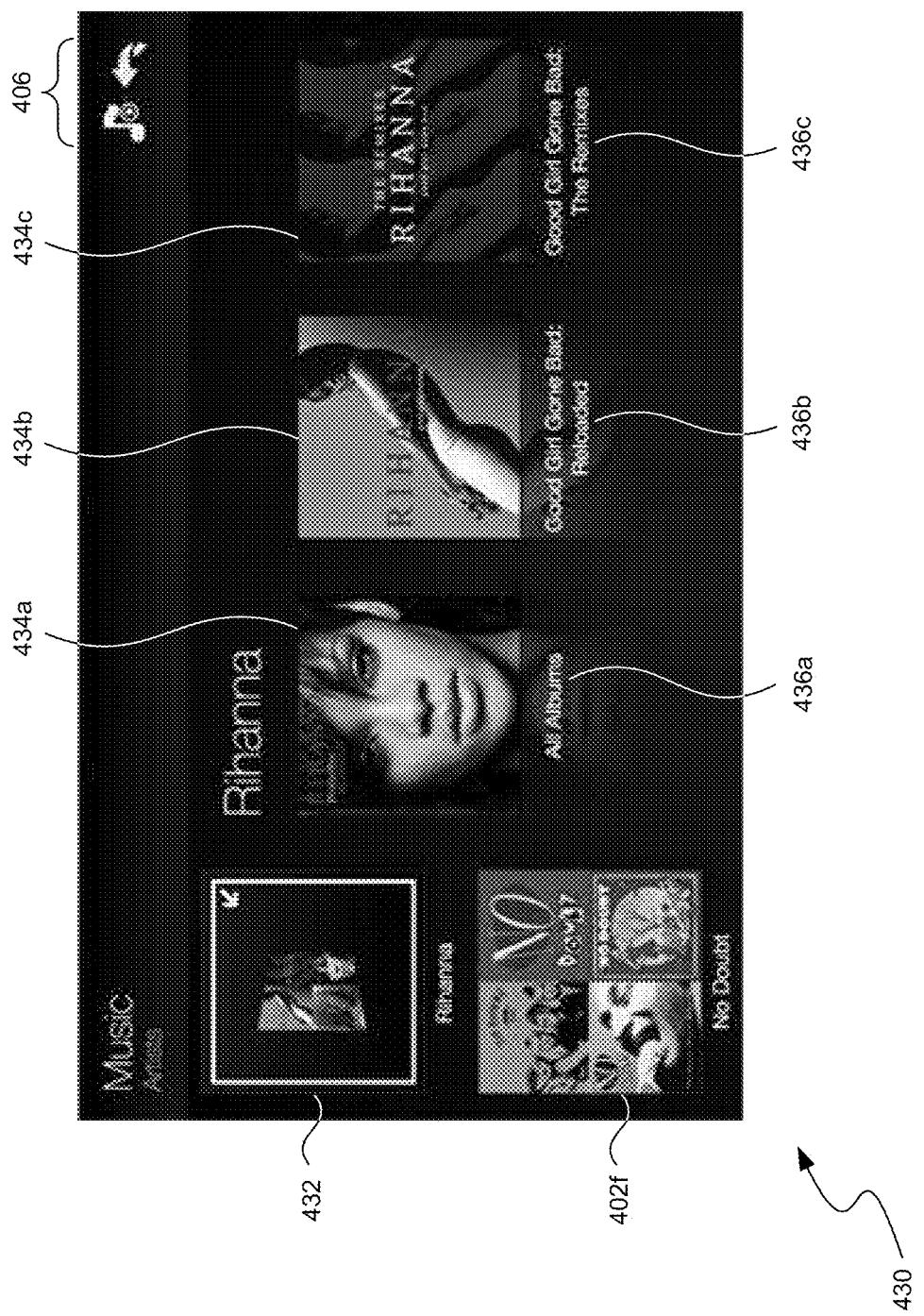

FIG. 4B is a second view 430 of the representative interface. The second view 430 is displayed in response to a user selecting an artist graphic to view albums associated with that artist. In particular, to enter the second view 430, the user selected the artist graphic 402b in the first view 400, which was associated with the artist Rihanna. In response to the selection, the system expands the display to show individual albums for the selected artist, while simultaneously showing one or more of the artist graphics 402a-402h. In effect, the system expands the display by shifting neighboring artist graphics to insert album graphics for the selected artist. Thus, in the second view 430, the initial display shows a modified graphic 432 for the selected artist, the artist graphic 402f from the first view 400, and a set of album graphics 434a-434c. In another example, the second view 430 shows the original artist graphic 402b, rather than the modified graphic 432 for the selected artist. The user may then scroll to the right to see additional artist graphics. An advantage of this configuration is that it allows the user to easily look at information for artists from a single screen, rather than having to continually navigate or switch between separate screens that display album information for each artist.

As noted above, the second view 430 displays a modified artist graphic 432 to indicate which artist was selected. In addition, the second view 430 comprises multiple album graphics 434a-434c, which correspond to albums for the selected artist. The first displayed album graphic 434a is a collective graphic that is associated with all of the albums for the selected artist. The second view 430 also comprises text labels 436a-436c that show the title of each album.

Figure 4C:
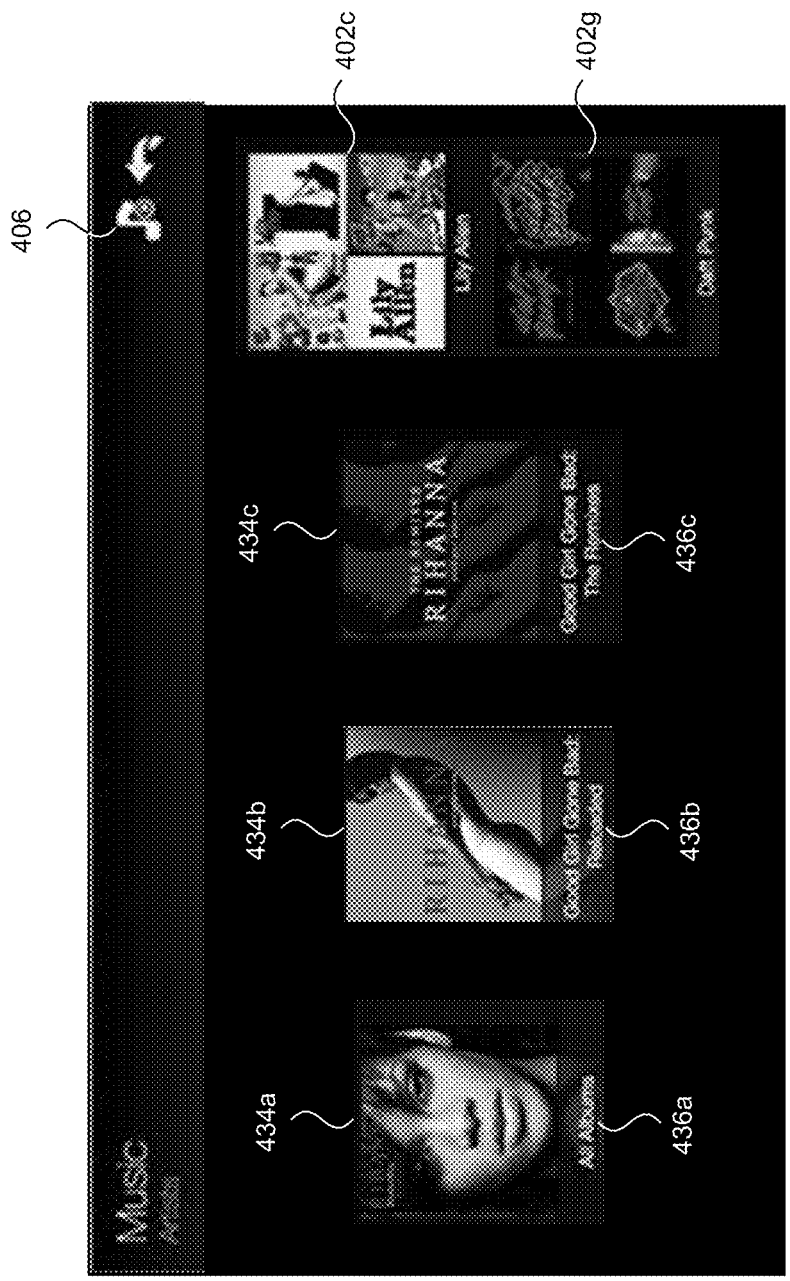

FIG. 4C is a third view 450 of the representative interface. The third view 450 is a scrolled version of the second view 430 shown in FIG. 4B. In particular, the user has scrolled the interface to the right so that the artist graphic for the selected artist is no longer displayed. As a result, the third view 430 comprises the set of album graphics 434a-434c displayed in the second view 430. However, the interface now displays artist graphics 402c and 402g, which were shifted when the system expanded the display to show albums for the selected artist. That is, the newly displayed artist graphics 402c and 402g were immediately adjacent to the selected artist graphic 402b in FIG. 4A before the user made a selection.

Figure 4D:
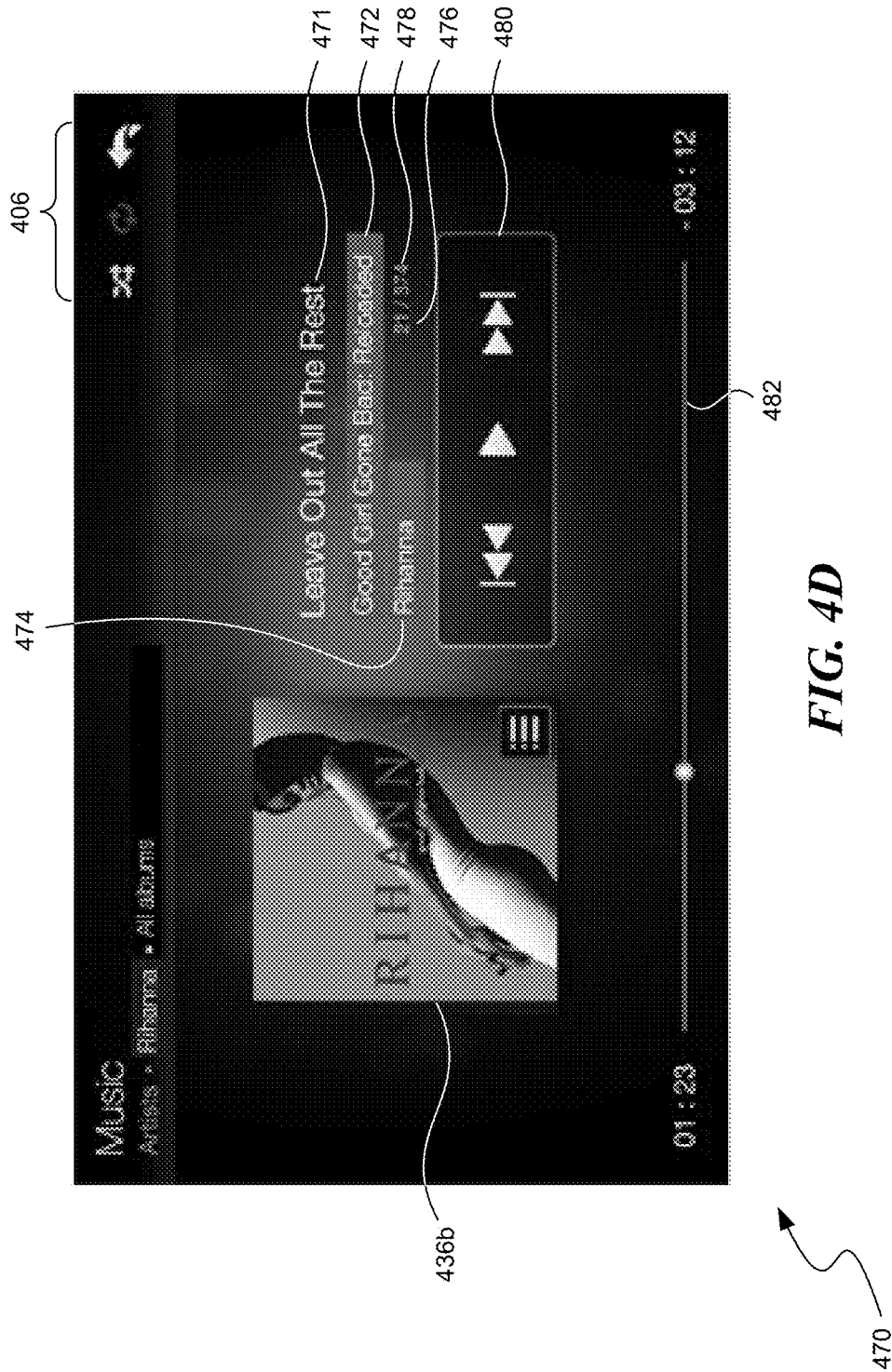

FIG. 4D is a fourth view 470 of the representative interface. The system displays the fourth view in response to a user selecting one of the album graphics in the second view 430 or the third view 450. In the example of FIG. 4D, selecting an album graphic causes the system to display the first item of the album. In another example, selecting the album graphic causes the system to immediately begin playing the first item (e.g., the first track) or the album. In other examples, selecting an album graphic causes the system to display a list of items associated with the album. In the fourth view 470, the system displays information about the selected item and the associated album. The information may be determined, for example, based on metadata stored as part of the item. The fourth view 470 comprises an album graphic 436b for the selected album. The fourth view 470 also comprises an item title 471, an album title 472, an artist name 474, an item number 476, and/or a total number of items 478. The item number may be based on a predetermined order within the selected album, while the total number may be based on the total number of items in the album. The fourth view 470 also comprises playback controls 480, which enable a user to start or stop playback, to seek to a time within the item, or to move to a new item in the album. There is also a playback information indicator 482, which provides information on the playback of the item, such as the total time and the amount of time remaining for playback.

Figure 5:
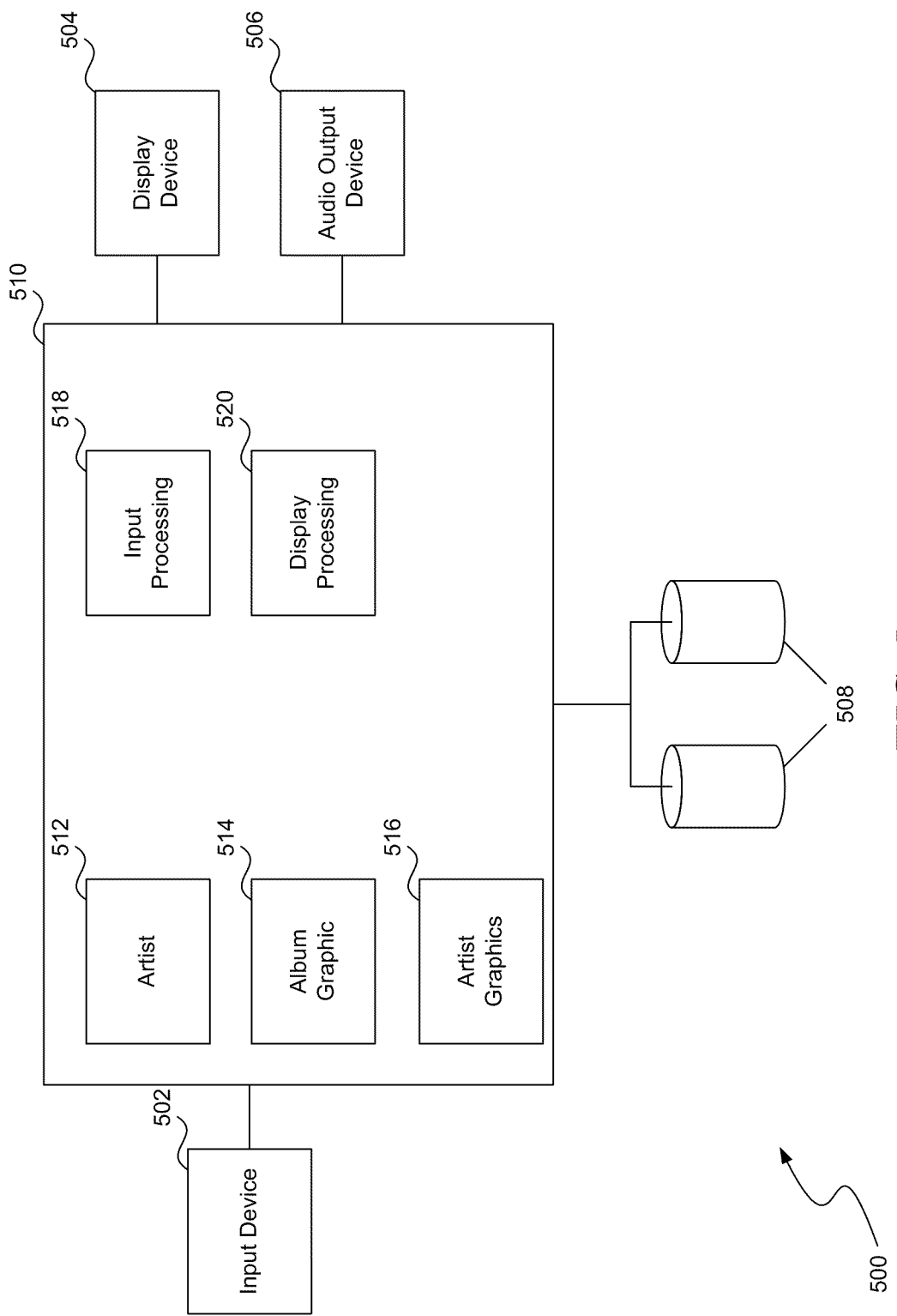
FIG. 5 is a logical block diagram of a media interface system.

FIG. 5 is a logical block diagram of a media interface system 500. The system 500 may be implemented by a computing device such as the mobile device 100 (FIG. 1). Aspects of the system may be implemented as special purpose hardware circuitry, programmable circuitry, or a combination of these. As will be discussed in additional detail herein, the system 500 comprises a number of modules to facilitate the functions of the system. The modules and their underlying code and/or data may be implemented in a single physical device or distributed over multiple physical devices and the functionality implemented by calls to remote services. Similarly, data could be stored in local storage or remote storage, and distributed in one or more physical devices. Assuming a programmable implementation, the code to support the functionality of this system may be stored on a computer-readable medium such as an optical drive, flash memory, or a hard drive. One skilled in the art will appreciate that at least some of these individual modules may be implemented using application specific integrated circuits (ASICs), programmable logic devices (PLDs), or a general purpose processor configured with software and/or firmware.

As shown in FIG. 5, the system 500 comprises an input device 502, which may be any device suitable for receiving user input to control the user interface. In some examples, the input device is a touch-sensitive screen that may receive input in response to a touch from a user's finger or from a stylus. In the case of a touch-sensitive screen, the input device 502 may be configured to receive a touch or press, which indicates a selection or command, and a drag or swipe motion, which indicates movement or scrolling on the screen. The input device 502 may also comprise one or more hardware buttons, touchpads, trackballs, or other input devices configured to allow the user to navigate and control the user interface. The system 500 also comprises various output devices. In particular, the system 500 comprises a display device 504, which is configured to provide a visual display of the user interface. The system 500 also comprises an audio output device 506, which is configured to output audio from multimedia items selected by the user. The audio output device 506 may be, for example, a speaker or a headphone jack.

The system 500 also comprises a storage component 508, which is configured to store multimedia items and settings information for the system 500. In particular, the storage component 508 stores a media library consisting of multimedia items that may be accessed using the media interface system. As described above, the multimedia items may be stored locally on the electronic device, remotely on a server that may be accessed through a wireless network connection, or a combination of these. Items stored remotely may be owned by the user or by a third party (e.g., a streaming media service provider). Regardless of the location, the storage component 508 is configured to provide access to media data, such as audio or video data, for playback and metadata, such as titles, artists, etc., for use by the user interface.

The system 500 also comprises a processing component 510, which is configured to control the display of the user interface based on information in the storage component 508 and input from the input device 502. The processing component 510 comprises an artist component 512, which is configured to determine a set of artists based on the multimedia items stored in the storage component 508. In one example, the artist component 512 evaluates the metadata for each of the multimedia items in the storage component 508 to determine an artist associated with each multimedia item. Alternatively, the storage component 508 may comprise a separate database or library listing that stores the metadata associated with each multimedia item. The database may be separately provided or may be automatically generated by a separate system when the multimedia items are added to the storage component 508. The artist component 512 may be configured to determine the set of artists associated with every multimedia item or may only determine a subset necessary to initially display the user interface.

The processing component 510 also comprises an album graphic component 514, which is configured to generate a set of album graphics for some or all of the artists in the set determined by the artist component 512. As noted above, multimedia items associated with a particular artist are divided into multiple albums. In general, each album is associated with an album cover or other graphic indicating its contents or title. Thus, once the set of artists is determined, the album graphic component 514 determines a set of albums for each artist and then determines a graphic for each album. If a graphic is not available, the system may use a default graphic. In addition, the album graphics component 514 is configured to determine a collective graphic to represent all albums associated with the particular artist. In some examples, the collective graphic is a slideshow generated based on the set of album graphics for the artist, such that the system displays each album graphic for a specified time (e.g., 2 seconds) before displaying the next album graphic.

For efficiency, the album graphics component 514 may be configured to generate album graphics only for a subset of artists in the set of artists determined by the artist component 512. This allows the system to be more efficient by dynamically generating the graphics when they are most likely to be needed, rather than generating the graphics all at one time. The subset may be selected based on the set of artists that will be displayed when the interface is activated. For example, the system may be configured to display artists in alphabetical order with eight artists displayed on screen at a time. In this case, the system could be configured to determine album graphics only for the first eight artists in the set of artists when the set is ordered alphabetically. Album graphics may be determined based on information stored by the storage component 508 or by using one or more external databases.

The processing component 510 also comprises an artist graphic component 516, which is configured to determine an artist graphic for each artist in the set of artists. As with the album graphic component 514, the artist graphic component 516 may generate graphics for every artist at one time or only a subset of the entire set of artists. Each artist graphic is generated based on one or more of the album graphics associated with that artist. This allows the user interface to immediately show some of the albums that are available for playback. In one example, the artist graphics are generated by tiling the multiple album graphics. For example, the artist graphics 402a-402h (FIG. 4A) are generated by arranging an album graphic at each corner of the square artist graphic.

The processing component 510 also comprises an input processing component 518, which is configured to receive user inputs through the input device 502 and to interpret the user inputs as commands to the system. Thus, the input processing component 518 receives touches, button presses, and motions on the touch-sensitive screen and interprets those inputs to determine the corresponding command. The processing component 510 also comprises a display processing component 520, which is configured to control the display of the user interface on the display device 504. In particular, the display processing component 520 displays an initial view (e.g., the first view 400 of FIG. 4A) and changes the interface in response to commands received through the input processing component 518. The control process is discussed in greater detail below with reference to FIG. 6.

Figure 6:
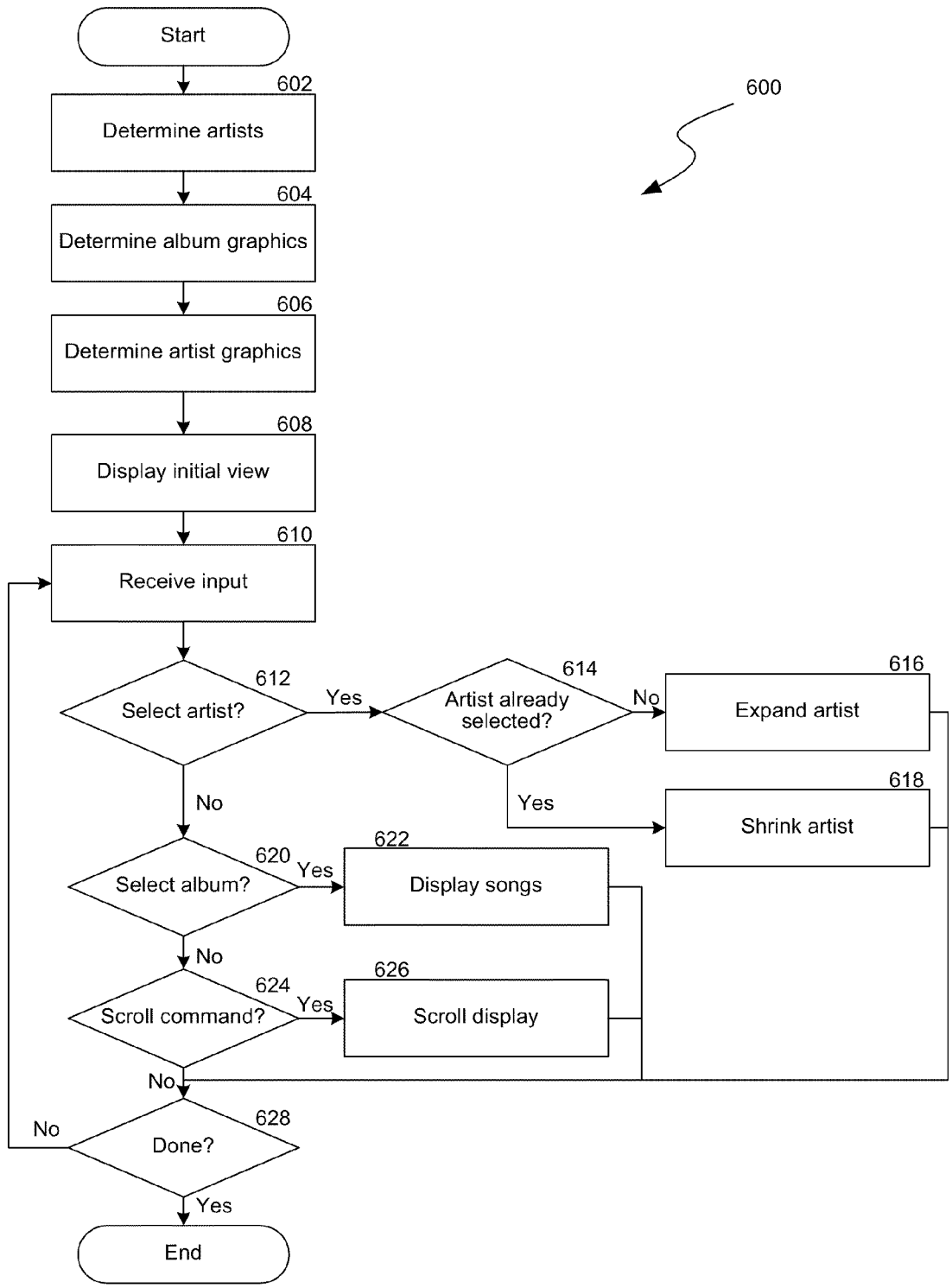
FIG. 6 is a flowchart of a process for controlling the media interface system.

FIG. 6 is a flowchart of a process 600 for controlling the media interface system. Processing begins at block 602, where the system determines a set of artists based on the multimedia items in the storage component 508. As discussed above, this step may comprise examining the metadata associated with each individual multimedia item or accessing a stored index or database that contains the required information and is pre-indexed. If the multimedia items are provided by a remote service, such as a streaming media provider, the set of artists may also be provided by the external service.

Processing then proceeds to block 604, where the system determines album graphics for some or all of the artists in the set of artists. As discussed above, for efficiency reasons, the system may initially determine album graphics for only a subset of the artists. The system may then determine additional album graphics at a later point in response to a user command (e.g., a scroll command) to display artists not in the original subset. The album graphics may be retrieved from the storage component 508 along with the multimedia items, or they may be accessed through separate databases, such as an online database of album graphics. In this step, the system also determines a collective graphic that is used to enable access to all multimedia items associated with a particular artist. The collective graphic may be any graphic designed to indicate that it links to multiple albums for the same artist. As described above, in some examples, the collective graphic is a slideshow that displays each of the individual album graphics for the particular artist in a continuous cycle.

Processing then proceeds to block 606, where the system determines artist graphics for some or all of the artists in the set of artists. In one example, the system generates artist graphics for the group of artists whose album graphics were determined in block 604. Each artist graphic is generated based on a combination of album graphics for that particular artist. In some examples, the artist graphics are generated using a template that has a set number of slots for album graphics for the artist. If not enough album graphics are available to fill every slot, the system may simply display a default graphic (e.g., a solid black block or an "X" graphic) in one or more of the slots. In one example, artist graphics are square with slots for album graphics at each corner of the square. If there are more album graphics than available slots in the template, the system may continuously display a selected subset of the album graphics or periodically change the set of album graphics used for the artist graphic.

Processing then proceeds to step 608, where the system displays an initial view of the user interface. In one example, the initial view corresponds to the first view 400 of FIG. 4A, such that only artist graphics are displayed. The artists may be arranged using any ordering scheme, such as alphabetical order or chronological order based on when the artist was added to the collection. The initial view may also comprise text showing the names of the corresponding artists. The display processing component 520 is limited by the size of the screen, such that it may only display a limited number of artist graphics, depending on the size of the individual graphics. As discussed below, the user interface provides the capability to change the display to a different set of artist graphics in response to scroll commands received from the user.

The system then executes a processing loop in blocks 610-628, in which it receives and processes user input to control the display of the user interface. In particular, the loop begins with block 610, where the system receives an input through the input processing component 518. Processing then proceeds to decision block 612, where the system determines if the received input selected an artist on the user interface. This may be done by determining if a user touch on a touch-sensitive screen hit an area that included an artist graphic. If the system determines that the input selected an artist, processing proceeds to decision block 614, where the system determines if the selected artist was already selected. If the selected artist is not already selected, processing proceeds to block 616, where the system expands the display to show albums for the selected artist. As discussed above, the expanded display simultaneously shows artist graphics and album graphics for the selected artist. In this step, the system may also modify the selected artist graphic to indicate the selection by, for example, placing a box around the selected artist graphic or highlighting the selected artist graphic. In addition, if another artist had previously been selected, the system may hide the album graphics associated with the previously selected artist and display a new set of album graphics for the newly selected artist.

However, if the system determines in decision block 614 that the artist had already been selected, processing proceeds to block 618, where the system shrinks the display by hiding the album graphics for the selected artist, reverting to the initial view. As discussed above, when the system expands a selected artist, it is as if the expansion shifts neighboring artist graphics apart in order to make space for the album graphics. Similarly, shrinking the selected artist removes the album graphics and allows the neighboring artist graphics to shift back into place.

If the system determines that the received input did not select an artist, processing proceeds to decision block 620, where the system determines if the received input selected an album. If so, processing proceeds to block 622, where the system changes to a new view (e.g., view 470 of FIG. 4D), in which it displays an individual song or songs associated with the selected album. In one example, the songs view displays a list of some or all of the songs associated with the selected album. In another example, the system displays a first song on the album and may begin playback of the first song.

If the system determines that the received input did not select an album, processing proceeds to decision block 624, where the system determines if the received input was a scroll command. If the system determines that the input was a scroll command, processing proceeds to block 626, where the system scrolls the display in response to the command. The scroll command causes the interface to display a different set of artist and album graphics depending on the amount of movement indicated by the scroll command. As discussed above, a scroll command may be indicated by a user making a directional motion on a touch-sensitive screen to indicate that the interface should move in a particular direction. As an alternative, the system may have one or more directional buttons, a joystick, an optical mouse, or a trackball that may be used to indicate that the display should move in a particular direction.

After the system has finished executing the received command, or if the received input does not correspond to a command, processing proceeds to decision block 628, where the system determines if processing should continue. In general, the system will determine that processing should end in response to receiving an exit command or other indication from the user that the electronic device should stop displaying the music interface. If the system has not received a stop command, processing returns to block 610, where the system receives a new input from the user. Otherwise, processing ends.

Although the system is described above as providing an interface for managing music items, it is not so limited. The system could also be used to provide an interface for other multimedia items (e.g., images, videos, or a combination of types) that are arranged in a hierarchy of categories. In these examples, the system uses a first level set of categories and a second level set of categories that correspond to artists and albums, respectively. The system may then use the methods described above to determine first level category graphics (e.g., artist graphics) and second level category graphics (e.g., album graphics) to be used in the interface. The interface is then controlled in a similar way, such that first level category graphics and second level category graphics are displayed simultaneously on a display in response to a user selection.

From the foregoing, it will be appreciated that specific examples of the invention have been described herein for purposes of illustration, but that various modifications may be made without deviating from the spirit and scope of the invention. Accordingly, the invention is not limited except as by the appended claims.

We claim:

1. A computer-implemented method for providing a user interface for accessing multimedia items using a mobile device, the method comprising:
   determining a set of artists based on a plurality of multimedia items associated with the mobile device;
   determining a set of album graphics associated with an individual artist in the set of artists,
      wherein each of the album graphics in a plurality of album graphics contained within the set of album graphics is associated with at least one multimedia item of the plurality of multimedia items, and
      wherein one album graphic contained within the set of album graphics apart from the plurality of album graphics is associated with each multimedia item of the plurality of album graphics;
   determining artist graphics for multiple artists of the set of artists;
   displaying a first view on a display screen associated with a mobile device, the first view comprising artist graphics associated with at least a portion of the set of artists;
   receiving a first user input selecting the artist graphic associated with the individual artist; and
   in response to the first user input, displaying a second view on the display screen, the second view simultaneously displaying artist graphics for at least a portion of the set of artists and at least a portion of the set of album graphics associated with the selected artist,
      wherein the plurality of album graphics comprise a scrollable area,
      wherein the extent to which the scrollable area may be scrolled is limited to the plurality of album graphics, and
      wherein the scrollable area is bounded by at least one artist graphic and the one album graphic contained within the set of album graphics apart from the plurality of album graphics.

2. The method of claim 1, further comprising:
   receiving a second user input selecting an individual album graphic of the set of album graphics; and in response to the second user input, displaying information relating to a multimedia item associated with the individual album graphic.

3. The method of claim 1, wherein each artist graphic is determined based on two or more of the set of album graphics associated with a corresponding artist of the multiple artists.

4. The method of claim 1, wherein the selected artist is a first artist and the set of album graphics is a first set of album graphics, and further comprising:
receiving a third user input selecting an artist graphic associated with a second artist of the set of artists;
in response to the third user input, hiding the first set of album graphics and simultaneously displaying artist graphics for at least a portion of the set of artists and a second set of album graphics associated with the second artist.

5. The method of claim 1, wherein the one album graphic contained within the set of album graphics apart from the plurality of album graphics is a slideshow based on the plurality of album graphics contained within the set of album graphics associated with the individual artist.

6. The method of claim 1, further comprising:
while displaying the second view, receiving a third user input selecting the selected artist graphic; and
in response to the third user input, displaying the first view.

7. The method of claim 1, wherein the artist graphic is based on a template having a specified number of slots for album graphics and wherein determining a set of artist graphics comprises including a filler graphic in an artist graphic if the set of album graphics associated with the corresponding artist comprises fewer graphics than the specified number of slots.

8. The method of claim 1, wherein at least one of the first user input or the second user input is received via a touch-sensitive input device associated with the mobile device.

9. The method of claim 1, further comprising displaying a default image for an album graphic if an album-specific graphic is not available.

10. The method of claim 1, wherein each artist graphic is determined based on a specified number of album graphics contained within the set of album graphics associated with the individual artist and further comprising periodically changing the artist graphic to be based on a different group of album graphics contained within the set of album graphics associated with the individual artist.

11. A system for providing a user interface for accessing multimedia items using an electronic device, the system comprising:
a memory;
a display device;
an input device;
a processor coupled to the memory, the display device, and the input device;
a first level category component configured to determine a set of first level categories based on a plurality of multimedia items associated with the electronic device;
a second level category graphic component configured to determine a set of second level category graphics associated with an individual first level category in the set of first level categories,
wherein each of the second level category graphics in a plurality of second level category graphics contained within the set of second level category graphics is associated with at least one multimedia item of the plurality of multimedia items, and
wherein one second level category graphic contained within the set of second level category graphics apart from the plurality of second level category graphics is associated with each multimedia item of the plurality of second level category graphics; and
a first level category graphic component configured to determine first level category graphics for multiple first level categories of the set of first level categories, wherein each first level category graphic is determined based on one or more of the set of second level category graphics associated with a corresponding first level category of the multiple first level categories;
a display component configured to:
display a first view on a display screen associated with the electronic device, the first view comprising first level category graphics associated with at least a portion of the set of first level categories;
in response to a first user input selecting the first level category graphic associated with the individual first level category, display a second view on the display device, the second view simultaneously displaying first level category graphics for at least a portion of the set of first level categories and at least a portion of the set of second level category graphics associated with the selected first level category,
wherein the plurality of second level category graphics comprise a scrollable area,
wherein the extent to which the scrollable area may be scrolled is limited to the plurality of second level category graphics, and
wherein the scrollable area is bounded by at least one first level category graphic and the one second level category graphic contained within the set of second level category graphics apart from the plurality of second level category graphics; and
in response to a second user input selecting an individual second level category graphic of the set of second level category graphics, displaying information relating to a multimedia item associated with the individual second level category graphic.

12. The system of claim 11, wherein the one second level category graphic contained within the set of second level category graphics apart from the plurality of second level category graphics is a slideshow based on the plurality of second level category graphics contained within the set of second level category graphics associated with the individual first level category.

13. The system of claim 11, wherein the display component is further configured to highlight the selected first level category graphic in response to the first user input.

14. The system of claim 11, wherein the display component is further configured to:
while displaying the second view, receive a third user input selecting the selected first level category graphic; and
in response to the third user input, display the first view.

15. The system of claim 11, wherein the first level category graphic is based on a template having a specified number of slots for second level category graphics and wherein the first level category graphic component is further configured to comprise a filler graphic in a first level category graphic if the set of second level category graphics associated with the corresponding first level category comprises fewer graphics than the specified number of slots.

16. The system of claim 11, wherein the input device is a touch-sensitive screen.

17. A computer-readable medium containing instructions for providing a user interface for accessing multimedia items using an electronic device comprising a processor and a memory, by a method comprising:

determining a set of artists based on a plurality of multimedia items associated with the electronic device;
determining a set of album graphics associated with an individual artist in the set of artists,
  wherein each of the album graphics in a plurality of album graphics contained within the set of album graphics is associated with at least one multimedia item of the plurality of multimedia items, and
  wherein one album graphic contained within the set of album graphics apart from the plurality of album graphics is associated with each multimedia item of the plurality of album graphics;
determining artist graphics for multiple artists of the set of artists, wherein each artist graphic is determined based on two or more of the set of album graphics associated with a corresponding artist of the multiple artists;
displaying a first view on a display screen associated with the electronic device, the first view comprising artist graphics associated with at least a portion of the set of artists;
receiving a first user input selecting the artist graphic associated with the individual artist;
in response to the first user input, displaying a second view on the display screen, the second view simultaneously displaying artist graphics for at least a portion of the set of artists and at least a portion of the set of album graphics associated with the selected artist,
  wherein the plurality of album graphics comprise a scrollable area,
  wherein the extent to which the scrollable area may be scrolled is limited to the plurality of album graphics, and
  wherein the scrollable area is bounded by at least one artist graphic and the one album graphic contained within the set of album graphics apart from the plurality of album graphics;
receiving a second user input selecting an individual album graphic of the set of album graphics; and
in response to the second user input, displaying information relating to a multimedia item associated with the individual album graphic.

18. The computer-readable medium of claim 17, wherein the selected artist is a first artist and the set of album graphics is a first set of album graphics, and wherein the method further comprises:
receiving a third user input selecting an artist graphic associated with a second artist of the set of artists;
in response to the third user input, hiding the first set of album graphics and simultaneously displaying artist graphics for at least a portion of the set of artists and a second set of album graphics associated with the second artist.

19. The computer-readable medium of claim 17, wherein the one album graphic contained within the set of album graphics apart from the plurality of album graphics is a slideshow based on the plurality of album graphics contained within the set of album graphics associated with the individual artist.

20. The computer-readable medium of claim 17, wherein the method further comprises highlighting the selected artist graphic in response to the first user input.

21. The computer-readable medium of claim 17, wherein the method further comprises:
while displaying the second view, receiving a third user input selecting the selected artist graphic; and
in response to the third user input, displaying the first view.

22. The computer-readable medium of claim 17, wherein the artist graphic is based on a template having a specified number of slots for album graphics and wherein determining a set of artist graphics comprises including a filler graphic in an artist graphic if the set of album graphics associated with the corresponding artist comprises fewer graphics than the specified number of slots.

23. The computer-readable medium of claim 17, wherein each artist graphic is determined based on a specified number of album graphics contained within the set of album graphics associated with the individual artist and further comprising periodically changing the artist graphic to be based on a different group of album graphics contained within the set of album graphics associated with the individual artist.

24. A computer-implemented method for providing a user interface for accessing multimedia items using an electronic device, the method comprising:
determining a set of first level categories based on a plurality of multimedia items associated with the electronic device;
determining a set of second level category graphics associated with an individual first level category in the set of first level categories,
  wherein each of the second level category graphics in a plurality of second level category graphics contained within the set of second level category graphics is associated with at least one multimedia item of the plurality of multimedia items,
  wherein one second level category graphic contained within the set of second level category graphics apart from the plurality of second level category graphics is associated with each multimedia item of the plurality of second level category graphics; and
determining first level category graphics for multiple first level categories of the set of first level categories;
displaying a first view on a display screen associated with the electronic device, the first view comprising first level category graphics associated with at least a portion of the set of first level categories;
receiving a first user input selecting a first level category graphic associated with the individual first level category item; and
in response to the first user input, displaying a second view on the display screen, the second view simultaneously displaying first level category graphics for at least a portion of the set of first level categories and at least a portion of the set of second level category graphics associated with the selected first level category,
  wherein the plurality of second level category graphics comprise a scrollable area,
  wherein the extent to which the scrollable area may be scrolled is limited to the plurality of second level category graphics, and
  wherein the scrollable area is bounded by at least one first level category graphic and the one second level category graphic contained within the set of album graphics apart from the plurality of second level category graphics.

25. A computer-implemented method for providing a user interface for accessing multimedia items using a mobile device, the method comprising:
determining a set of artists based on a plurality of multimedia items associated with the mobile device;
determining a set of album graphics associated with an individual artist in the set of artists,
  wherein each of the album graphics in a plurality of album graphics contained within the set of album graphics is associated with at least one multimedia item of the plurality of multimedia items, and
wherein each multimedia item is only associated with one album graphic through album title metadata associated with the multimedia item, and
wherein one album graphic contained within the set of album graphics apart from the plurality of album graphics is associated with each multimedia item of the plurality of album graphics through artist title metadata associated with the multimedia items;

determining artist graphics for multiple artists of the set of artists;

displaying a first view on a display screen associated with a mobile device, the first view comprising artist graphics associated with at least a portion of the set of artists;

receiving a first user input selecting the artist graphic associated with the individual artist; and in response to the first user input, displaying a second view on the display screen, the second view simultaneously displaying artist graphics for at least a portion of the set of artists and at least a portion of the set of album graphics associated with the selected artist wherein the plurality of album graphics comprise a scrollable area, wherein the extent to which the scrollable area may be scrolled is limited to the plurality of album graphics, and wherein the scrollable area is bounded by at least one artist graphic and the one album graphic contained within the set of album graphics apart from the plurality of album graphics.

* * * * *